(12) United States Patent
Ozaki et al.

(10) Patent No.: US 9,008,849 B2
(45) Date of Patent: Apr. 14, 2015

(54) POWER SYSTEM FOR RESIDENCE

(75) Inventors: Daijiro Ozaki, Tama (JP); Masaharu Kimitsuki, Miyoshi (JP)

(73) Assignees: Toyota Housing Corporation, Nagoya (JP); Misawa Homes Co., Ltd., Tokyo (JP)

( * ) Notice: Subject to any disclaimer, the term of this patent is extended or adjusted under 35 U.S.C. 154(b) by 370 days.

(21) Appl. No.: 13/579,712

(22) PCT Filed: Feb. 16, 2011

(86) PCT No.: PCT/JP2011/053261
§ 371 (c)(1),
(2), (4) Date: Aug. 17, 2012

(87) PCT Pub. No.: WO2011/102374
PCT Pub. Date: Aug. 25, 2011

(65) Prior Publication Data
US 2012/0323387 A1 Dec. 20, 2012

(30) Foreign Application Priority Data
Feb. 17, 2010 (JP) ................................. 2010-032025

(51) Int. Cl.
G06F 1/26 (2006.01)
H02J 7/35 (2006.01)
H02J 3/38 (2006.01)

(52) U.S. Cl.
CPC .. *H02J 7/35* (2013.01); *H02J 3/383* (2013.01); *Y02E 10/563* (2013.01); *Y02E 10/566* (2013.01); *Y02B 10/14* (2013.01)

(58) Field of Classification Search
CPC ............ H02J 3/383; H02J 7/35; Y02B 10/14; Y02E 10/563; Y02E 10/566
USPC ................. 700/286, 291, 295, 296, 297, 298; 307/66, 69
See application file for complete search history.

(56) References Cited

U.S. PATENT DOCUMENTS 7,312,539 B2 * 12/2007 Nakata et al. .................... 307/66
7,439,635 B2 * 10/2008 Nakata et al. .................... 307/66
(Continued)

FOREIGN PATENT DOCUMENTS

| CN | 1591950 A | 3/2005 |
| CN | 101375482 A | 2/2009 |

(Continued)

OTHER PUBLICATIONS

Combined Chinese Office Action and Search Report issued Jul. 3, 2014 in Patent Application No. 201180009634.8 (with English language translation).

(Continued)

*Primary Examiner* — Charles Kasenge
(74) *Attorney, Agent, or Firm* — Oblon, McClelland, Maier & Neustadt, L.L.P.

(57) ABSTRACT

The present invention provides a household electric power system, comprising an electric control device that predicts whether voltage suppression will occur at the system side according to the historical data including voltage fluctuation at the system side, date and time, outdoor air temperature, and meteorological condition, etc. when voltage suppression occurred at the system side previously, and the present data including voltage fluctuation at the system side, date and time, outdoor air temperature, and meteorological condition, etc. The electric control device stores the surplus power generated by a solar electric power generation device as energy into an energy storage device, if voltage suppression is predicted to occur at the system side; thus, the purpose of the surplus power generated by the solar electric power generation device can be switched from selling electricity to the system side, to storing as energy.

9 Claims, 2 Drawing Sheets

(56) References Cited

U.S. PATENT DOCUMENTS

| | | | |
|---|---|---|---|
| 8,102,074 B2* | 1/2012 | Hadar et al. | 307/5 |
| 8,103,389 B2* | 1/2012 | Golden et al. | 700/295 |
| 8,180,499 B2* | 5/2012 | Kanai | 700/288 |
| 8,227,937 B2* | 7/2012 | Barlock et al. | 307/66 |
| 2004/0070280 A1* | 4/2004 | Nakata et al. | 307/69 |
| 2007/0241617 A1* | 10/2007 | Nakata et al. | 307/69 |
| 2009/0295162 A1 | 12/2009 | Oohara et al. | |
| 2010/0019577 A1* | 1/2010 | Barlock et al. | 307/66 |
| 2013/0020873 A1* | 1/2013 | Barlock et al. | 307/65 |

FOREIGN PATENT DOCUMENTS

| | | |
|---|---|---|
| CN | 101438367 A | 5/2009 |
| JP | 6 133472 | 5/1994 |
| JP | 2612639 | 5/1997 |
| JP | 11 46458 | 2/1999 |
| JP | 2884187 | 4/1999 |
| JP | 2001 8385 | 1/2001 |
| JP | 2002 34161 | 1/2002 |
| JP | 2004 274812 | 9/2004 |
| JP | 2010 233352 | 10/2010 |
| JP | 2010-233352 | 10/2010 |

OTHER PUBLICATIONS

International Preliminary Report on Patentability issued Aug. 21, 2012 in Application No. PCT/JP2011/053261.

International Preliminary Report on Patentability issued Sep. 18, 2012 in Application No. PCT/JP2011/053261.

Written Opinion issued May 24, 2011 in Application No. PCT/JP2011/053261 (With English Translation).

Japanese Office Action issued Dec. 10, 2013, in Japan Patent Application No. 2010-032025 (with English translation).

International Search Report Issued May 24, 2011 in PCT/JP11/053261 Filed Feb. 16, 2011.

* cited by examiner

POWER SYSTEM FOR RESIDENCE

FIELD OF THE INVENTION

The present invention relates to a household electric power system, which comprises a system side power source, a solar electric power generation device that works with the system side power source, and an energy storage device that can store the electric power generated by the solar electric power generation device as energy.

BACKGROUND OF THE INVENTION

The system described in patent document 1 is known as a solar electric power generation system that works with external power source (system side power source) such as a commercial electric power system, etc.

The solar electric power generation system comprises: a solar battery module; an electric storage device; a discharge control device that controls the discharging of the electric storage device; a charge control device that controls the charging from external power source to the electric storage device; and an electric inverter that takes the electric power of the solar battery module or electric storage device as the input and supplies electric power to the external power source or electric loads; wherein, the solar battery module is connected to the electric inverter in a way that it inputs the electric power generated by it to the electric inverter, the electric storage device is connected to the electric inverter in a way that it inputs the electric power via the discharge control device to the electric inverter, and the electric storage device is connected to the external power source via the charge control device; when the electric inverter operates, the discharge control device controls the discharging of the electric storage device in a way that the electric power input from the solar battery module or electric storage device to the electric inverter is always maintained above a specified value.

In addition, in the solar electric power generation system, the electric inverter always operates with electric power input above the specified value, so that it always maintains a high inversion efficiency; moreover, the electric storage device is charged from the external power source under control of the charge control device, and therefore the charging is not affected by the output of the solar battery module and the electric quantity of charge can always be achieved as planned; hence, the phenomenon of inadequate charged electric quantity can be avoided.

PATENT DOCUMENTS

Patent document 1: Patent Publication No. JP1999-46458

SUMMARY OF THE INVENTION

However, in the solar electric power generation system described above, if the generated power is sold (reverse power flow) continuously, the voltage in the external electric power system will rise. Therefore, in the solar electric power generation system, when the voltage at the system side is higher than a specified value, the voltage at the system side is suppressed by restricting the electric power output or stopping the solar electric power generation system; as a result, the surplus generated power can't be sold to the system any more, and even the electric power for household purpose has to be bought from an electric utility company.

In view of above problem, the object of the present invention is to provide a household electric power system, which can predict the occurrence of suppression of voltage at the system side, and switch the surplus power generated by the solar electric power generation device from selling to the system side to storing as energy.

To solve above problem, for example, as shown in FIG. 1 and FIG. 2, the household electric power system described in claim 1 comprises external system side power source 1, a solar electric power generation device 2 that works with the system side power source 1, and an energy storage device 3 that can store the power generated by the solar electric power generation device 2 as energy;

Wherein, the household electric power system further comprises an electric control device 6, which can predict whether voltage suppression will occur at the system side according to the historical data including voltage fluctuation at the system side, date and time, outdoor air temperature and meteorological condition, etc. when voltage suppression occurred at the system side previously and the present data including voltage fluctuation at the system side, date and time, outdoor air temperature and meteorological condition, etc., and store the surplus power generated by the solar electric power generation device 2 into the energy storage device 3 if voltage suppression is predicted to occur at the system side.

In the invention described in claim 1, the electric control device 6 predicts whether voltage suppression will occur at the system side according to the historical data including voltage fluctuation at the system side, date and time, outdoor air temperature, and meteorological condition, etc. when voltage suppression occurred at the system side previously and the present data including voltage fluctuation at the system side, date and time, outdoor air temperature, and meteorological condition, etc., and if voltage suppression is predicted to occur at the system side, the purpose of the surplus power generated by the solar electric power generation device 2 can be switched from selling to the system side to storing as energy.

In the invention described in claim 2, in the household electric power system described in claim 1, characterized in that, if the electric control device 6 predicts that no voltage suppression will occur at the system side, it chooses to sell the surplus power generated by the solar electric power generation device 2 to the system side or store the surplus generated power as energy into the energy storage device.

Here, based on the selection made by the electric control device 6, the user can select and log in advance with an input device connected to a display unit 14 on the control device 6.

In the invention described in claim 2, if the electric control device 6 predicts that no voltage suppression will occur at the system side, it can choose freely to sell the surplus power generated by the solar electric power generation device 2 to the system side or store the surplus generated power as energy into the energy storage device 3.

In the invention described in claim 3, in the household electric power system described in claim 1 or 2, characterized in that, the energy storage device 3 has a plurality of storage batteries 7 . . . ;

The electric control device 6 charges at least one of the plurality of storage batteries 7 . . . with the electric power generated by the solar electric power generation device 2, so that the rest storage batteries 7 in fully charged state can discharge in order to supply power to household electric loads 5.

In the invention described in claim 3, on one hand, the electric control device 6 charges at least one of the plurality of storage batteries 7 . . . with the electric power generated by the solar electric power generation device 2; on the other hand, the electric control device 6 controls the rest storage batteries 7 in fully charged state to discharge and supply power to the household electric loads 5; thus, when the storage batteries 7 are charged with the generated power, they can be used as a stable power source for the household electric loads 5, and therefore it is unnecessary to buy electricity from the system side power source 1. Therefore, the electric power generated by the solar electric power generation device 2 can be utilized more stably than before, without any waste.

In the invention described in claim 4, in the household electric power system described in claim 3, characterized in that, at least one of the plurality of storage batteries 7 . . . that constitute the energy storage device 3 is compatible to the storage battery 11 in the traveling object 10.

In addition, the storage battery 11 in the traveling object 10 can be charged via the traveling object 10 from at least one of the system side power source 1, solar electric power generation device 2, and energy storage device 3.

In the invention described in claim 4, the compatible storage batteries 7 can be charged and prepared at the house side even when traveling object 10 is not at home. Moreover, in case of power outage or any emergency, the storage battery 11 in the traveling object 10 can be used as a power source for the house.

In the invention described in claim 5, in the household electric power system described in claim 3 or 4, characterized in that, The energy storage device 3 further has a thermal storage device 8 that converts electric energy into thermal energy and stores the thermal energy, besides the storage batteries 7.

In the invention described in claim 5, the surplus power generated by the solar electric power generation device 2 can be stored as thermal energy into the thermal storage device 8.

In the present invention, the electric control device predicts whether voltage suppression will occur at the system side according to the historical data when voltage suppression occurred at the system side previously and the present data; if voltage suppression is predicted to occur at the system side, the electric control device will store the surplus power generated by the solar electric power generation device into the energy storage device; thus, the surplus power generated by the solar electric power generation device can be switched from selling electricity to the system side to storing energy. As a result, the energy can be utilized without any waste.

BRIEF DESCRIPTION OF THE DRAWINGS

Hereunder the accompanying drawings of the present invention will be described briefly.

BRIEF DESCRIPTION OF THE SYMBOLS

Figure 1:
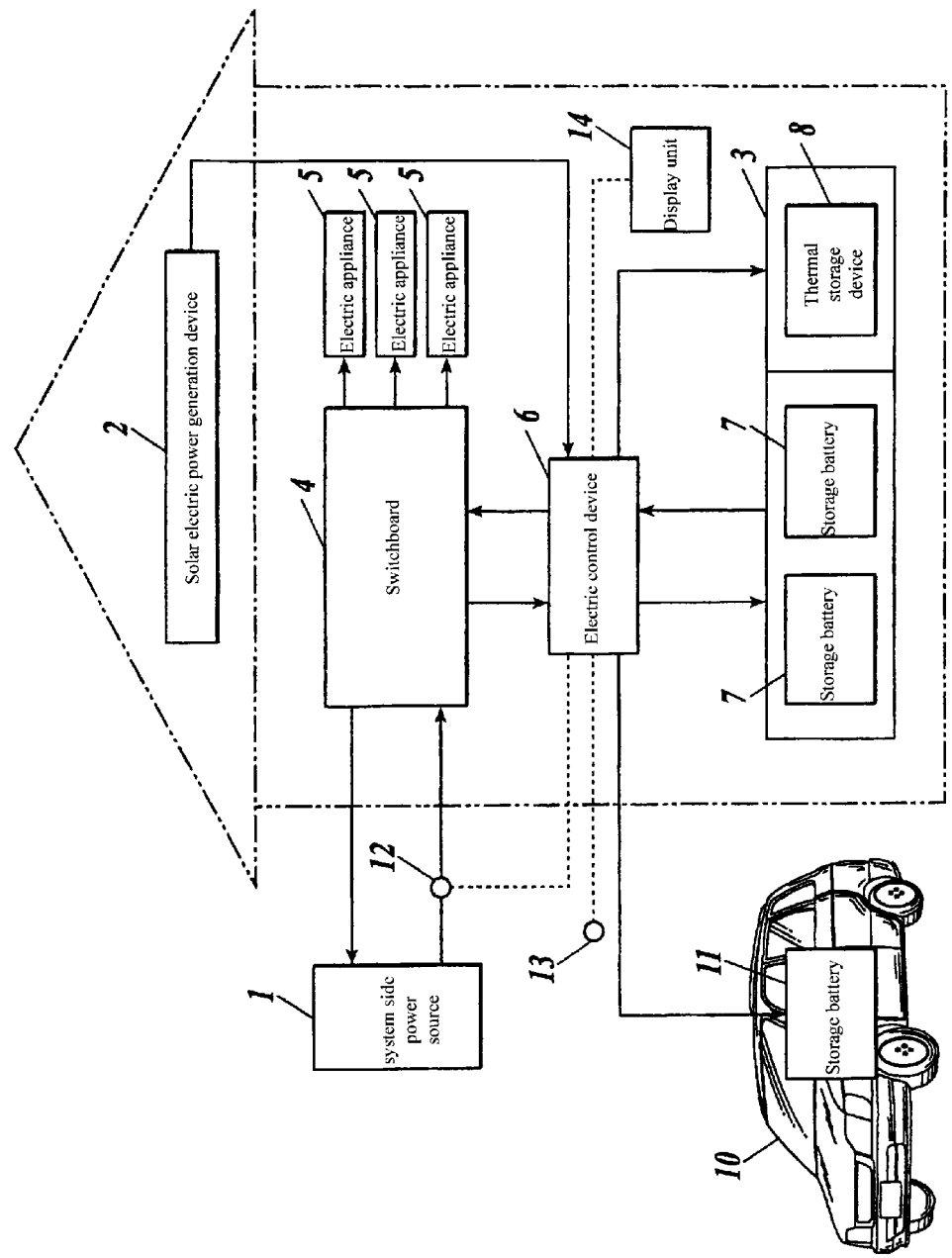
FIG. 1 is a schematic structural block diagram of the household electric power system disclosed in the present invention.

1. System side power source
2. Solar electric power generation device
3. Energy storage device
5. Electric appliance (household electric load)
6. Electric control device
7. Storage battery
8. Thermal storage device
10. Traveling object
11. Storage battery

DETAILED DESCRIPTION OF THE EMBODIMENTS

Hereunder the household energy management system disclosed in the present invention will be described in an example, with reference to the accompanying drawings.

Figure 2:
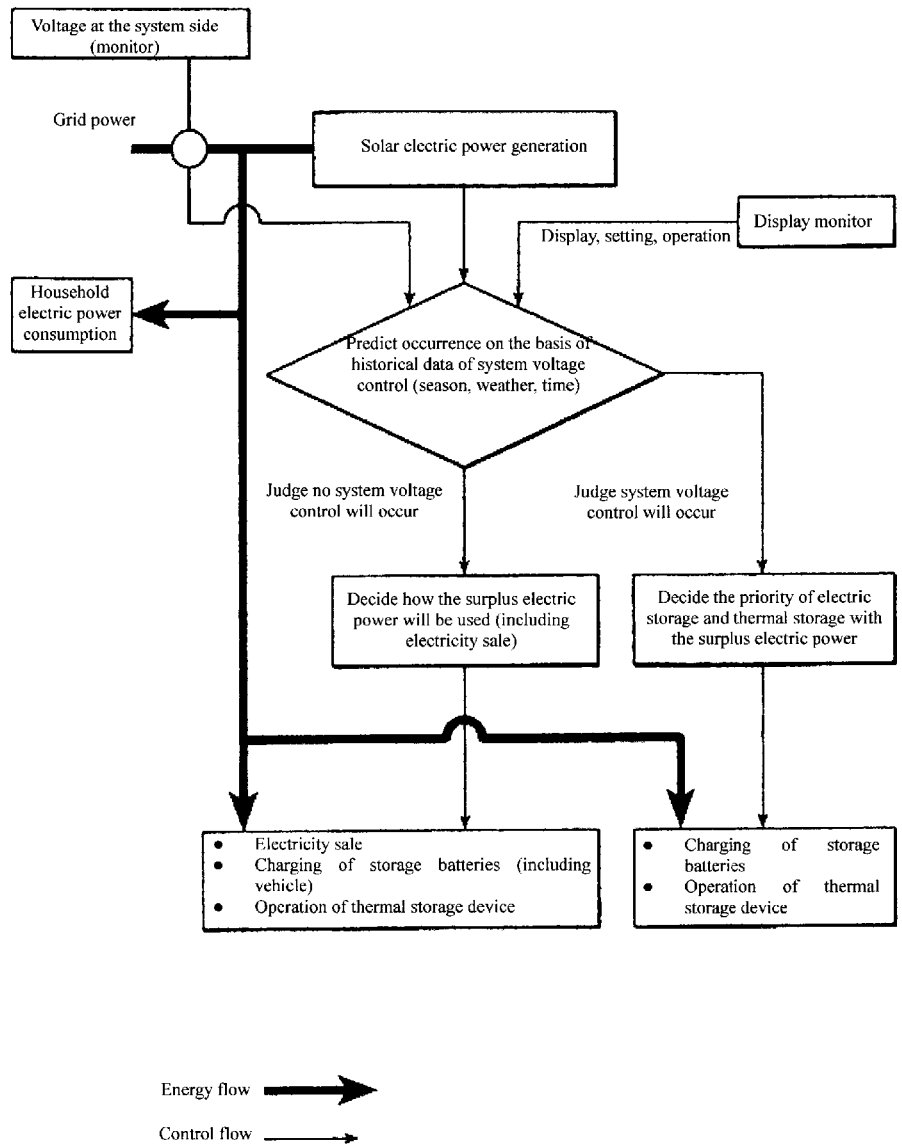
FIG. 2 is a diagram that illustrates the control method for the household electric power system disclosed in the present invention.

FIG. 1 is a schematic structural block diagram of the household electric power system disclosed in the present invention. FIG. 2 is a diagram that illustrates the control method of the same household electric power system.

As shown in FIG. 1, the household electric power system comprises: a system side power source 1, a solar electric power generation device 2 that works with the system side power source 1, and an energy storage device 3 that stores the electric power generated by the solar electric power generation device 2 as energy.

The system side power source 1 supplies AC electric power from an electric utility company, and is connected to a switchboard 4 arranged in the house. The switchboard 4 is connected with electric appliances (household electric loads) 5 . . . . The electric appliances (household electric loads) 5 . . . are refrigerators, washing machines, air conditioners, TV sets, and electric lamps, etc. in the house.

The solar electric power generation device 2 is connected to an electric control device 6 on the switchboard 4.

The energy storage device 3 has a plurality of storage batteries 7 . . . and a thermal storage device 8, which are connected to the electric control device 6.

The storage batteries 7 store the surplus power generated by the solar electric power generation device 2 and grid power at a lower price during nocturnal time, and can discharge as required.

The thermal storage device 8 is an electric water heater, which can store electric power as thermal energy.

The pluralities of storage batteries 7 that constitute the energy storage device 3 are compatible with the storage battery 11 in a traveling object 10. The storage battery 11 can be connected to the electric control device 6, and can be charged through a cable from the system side power source 1 or solar electric power generation device 2 at the house side.

The traveling object 10 is an electric power operated vehicle, such as a plug-in hybrid vehicle (PHV) and electric vehicle (EV), etc., and has the storage battery 11. In addition, the traveling object 10 is not limited to four-wheel vehicles, which is to say, it can also be a two-wheel motorcycle or motor scooter.

In addition, in the electric control device 6, the electric appliances 5 . . . are powered from at least one of the system side power source 1, solar electric power generation device 2, energy storage device 3, and the storage battery 11 of the traveling object 10; moreover, the priority of the plurality of storage batteries 7, including the storage battery 11, can be selected for charging/discharging. In addition, in the household electric power system, at least an electric power supply system comprises the storage battery 11 of the traveling object 10.

The electric control device 6 has the following function: it predicts whether voltage suppression will occur at the system side according to the historical data including voltage fluctuation at the system side, date and time, outdoor air temperature, and meteorological condition, etc. when voltage suppression occurred at the system side previously and the present data including voltage fluctuation at the system side, date and time, outdoor air temperature, and meteorological condition, etc., and stores the surplus power generated by the solar electric power generation device 2 as energy into the energy storage device 3 if voltage suppression is predicted to occur at the system side.

Hereunder how the electric control device 6 predicts the occurrence of voltage suppression at the system side will be described.

First of all, the electric control device 6 stores (accumulates) the historical data including occurrence of voltage suppression at the system side.

A voltage detector 12 that can monitor the voltage at the system side is installed at the system side, and is connected to the electric control device 6. In addition, the voltage detector 12 monitors the voltage at the system side, and, once voltage suppression occurs at the system side, the electric control device 6 stores historical data, including the "date and time", "outdoor air temperature", and "meteorological condition", etc., at that time.

The "date and time" further comprises season, weekday and holiday, and time period data. The electric control device 6 has a clock function. With that function, the electric control device 6 obtains the data, including "date and time", "season", "weekday and holiday", and "time period", scores the data, and stores the data in it.

Moreover, the electric control device 6 is connected with a temperature sensor 13 that can detect the outdoor air temperature; thus, the electric control device 6 utilizes the temperature sensor 13 to obtain the data of outdoor air temperature when voltage suppression occurs at the system side, scores the data, and stores the data in it.

The "meteorological condition" refers to meteorological data such as sunny, cloudy, rainy, etc.; for example, a meteorological sensor is connected to the electric control device 6. With the meteorological sensor, the electric control device 6 obtains the data of meteorological condition when voltage suppression occurs at the system side, scores the data, and stores the data in it. Moreover, the electric control device 6 can be connected to Internet, so that it obtains the data of meteorological condition from a weather information website when voltage suppression occurs at the system side, scores the date, and stores the data in it.

For example, the electric control device 6 scores the data as follows.

Suppose the score based on weather (meteorological condition) is a, then, for sunny days, a=1 point, for cloudy days, a=0.5 point, for rainy days, a=0; thus, the data of meteorological condition is scored.

Suppose the score based on outdoor air temperature T is b, then, if $T<10°$ C. or $30°$ C.$\leq T$, then b=1 point; if $10°$ C.$\leq T<15°$ C. or $25°$ C.$\leq T<30°$ C., then b=0.5 point; if $15°$ C.$\leq T<25°$ C., then b=0 point; thus, the data of outdoor air temperature is scored.

Suppose the score based on weekday and weekend is c, then, for weekdays, c=1 point; for weekends, c=0 point; thus, the data of weekday and weekend is scored.

Suppose the score based on season is d, then, for June-September, d=1 point; for December-April, d=1 point; for May and October-November, d=0 point; thus, the data of season is scored.

Suppose the score based on time period is e, then, for the time period 10:00-16:00, e=1 point; for the time period 7:00-10:00 and 16:00-19:00, e=0.5 point; for the time period 0:00-7:00 and 19:00-24:00, e=0 point; thus, the data of time period is scored.

The electric control device 6 obtains and stores the data of "voltage fluctuation at the system side" as follows . . . .

First of all, suppose the score of voltage at the system side at the beginning of solar electric power generation in the day when voltage suppression occurs at the system side is f, then, if $Vs \geq 105V$, then f=1 point; if $103V \leq Vs < 105$, then f=10.5 point; if $Vs < 103V$, then f=10 point; thus, the data is scored.

Next, suppose the score of amount of voltage variation at the system side from the time when voltage suppression occurs at the system side is g, the voltage when voltage suppression occurs at the system side is V1, the time when voltage suppression occurs at the system side is T1, the minimum voltage at the system side in the time period from the time the solar electric power generation begins to the time voltage suppression occurs at the system side is V0, and the time when the voltage at the system side reaches to V0 is T0, then, the amount of voltage variation at the system side vs. the elapsed time is: $dV/dt = (V1-V0)/(T1-T0) [V/h]$.

Moreover, if $dV/dt \geq 3$, then g=1 point; if $0 \leq dV/dt < 3$, then g=0.5 point; if $dV/dt < 0$, then g=0 point; thus, the data is scored.

In addition, suppose the score of occurred voltage suppression at the system side is P (occurred), then, P (occurred)= $(a+b+c+d+e)\alpha + f\beta + g\gamma$.

Where, $\alpha$, $\beta$, and $\gamma$ are weight factors (influence factors), and they depend on the ecologic environment and conditions of the house and inherent variation characteristics of the area, etc.; in addition, they can be changed by the user. For example, for a house in an area, $\alpha=1$, $\beta=0.5$, and $\gamma=2$.

Next, the electric control device 6 calculates the present data including voltage fluctuation at the system side, date and time, outdoor air temperature, and meteorological condition, etc. in the same way as described above, and scores the data.

Now, the values a-e are calculated according to the date and time, outdoor air temperature, and meteorological condition, etc., on the day.

Moreover, suppose the score of voltage at the system side when the solar electric power generation begins on the day is f, then, the value f is calculated in the same way as described above.

Moreover, suppose the score of amount of voltage variation at the system side in the elapsed time on the day is g, then, the value g is calculated in the same way as described above.

In addition, suppose the score of predicted voltage suppression at the system side is P (predicted), then, P (predicted)= $(a+b+c+d+e)\alpha + f\beta + g\gamma$.

Moreover, the P (predicted) is predicted by comparing the score of occurrence P (occurred) at the time with the average value Pn in the past n times of voltage suppression at the system side on the day.

For example, if the score of occurrence prediction P (predicted) at a time is higher than 80% of Pn and that condition lasts for a specified time period, the electric control device 6 will provide an alert; likewise, if P (predicted) is higher than 90% of Pn for a specified time period, the electric control device 6 will judge voltage suppression will occur at the system side, and thereby exercises control to store the surplus power generated by the solar electric power generation device 2 into the energy storage device 3. That is to say, the electric control device 6 will exercise control to switch the power supply from electricity sale to electric and thermal storage in the house automatically.

In addition, a display unit 14 mounted on an inner wall of the house, etc. is connected to the electric control device 6, and the electric control device 6 displays the alert on the display unit 14. For example, the electric control device can trigger a warning indicator on the display unit 14 to flash or trigger a speaker to give off a warning sound.

In a household electric power system with the foresaid electric control device 6, automatic (unattended) operation mode and manual (user-defined) operation mode can be selected from the selection screen on the display unit 14. When the automatic operation mode is selected, the system is controlled by the electric control device 6, as described above. In the manual mode, the user can change the setting of a-e and score setting freely, and thereby change the weight factors α, β, γ freely, with consideration of local and environmental conditions, etc.

On the other hand, if the score of occurrence prediction P (predicted) at a time is lower than 80% of Pn and that conditions lasts for a specified time period, the electric control device 6 will predict that no voltage suppression will occur at the system side, and thereby can select whether to sell the surplus power generated by the solar electric power generation device 2 to the system side or store the surplus generated power into the energy storage device 3.

Automatic mode and manual mode are available for the selection. In automatic mode, the electric control device 6 charges the storage batteries 7, till the storage batteries 7 that constitute the energy storage device 3 are fully charged; when or after the storage batteries are fully charged, the electric control device 6 will exercise control to sell the electric power (electricity sale) to the system side. In manual mode, the user can select whether to sell the surplus generated power to the system side, store the surplus generated power into the energy storage device 3, or utilize the surplus generated power to charge the storage battery 11 of the traveling object 10 on the selection screen of the display unit 14.

Moreover, the electric control device 6 can select whether to store the electric power from the system side power source 1 into the energy storage device 3 or utilize the electric power to charge the storage battery 11 of the traveling object 10; the user can set the priority for the selection in advance on the selection screen of the display unit 14.

In addition, the electric control device 6 charges at least one of the storage batteries 7 . . . that constitute the energy storage device 3 with the electric power generated by the solar electric power generation device 2, and controls the rest storage batteries 7 that are in fully charged state to discharge and supply power to the electric appliances (household electric loads) 5. The discharged electric power is supplied via the switchboard 4 to the electric appliances (household electric loads) 5.

Here, the display unit 14 always displays how the electric power is controlled by the electric control device 6. For example, the display unit 14 displays the voltage monitored based on the voltage detector 12, the result of voltage suppression prediction concluded on the basis of the voltage at the system side measured by the electric control device 6, the condition of electricity sale to the system side, and the state of the power generated based on the solar electric power generation device 2 and the charged capacity of the storage batteries 7 on the basis of the power supplied by at least one electric power supply system.

Moreover, the display unit 14 can display the charged capacity in a first storage battery 7 that has the least charged capacity and a second storage battery 7 that has the second least charged battery.

In the following, an example of the control method of the household electric power system in this embodiment will be described, with reference to FIG. 1 and FIG. 2.

In a household electric power system, if the electric power is supplied from the system side power source 1 and the solar electric power generation device 2 generates electric power at the same time, the electric control device 6 predicts whether voltage suppression will occur at the system side, according to the historical data including voltage fluctuation at the system side, date and time, outdoor air temperature, and meteorological condition, etc. when voltage suppression occurred at the system side previously and the present data including voltage fluctuation at the system side, date and time, outdoor air temperature, and meteorological condition, etc. In addition, the voltage at the system side is always detected and monitored by the voltage detector 12.

On one hand, if the electric control device 6 predicts voltage suppression will occur at the system side, it stops selling electricity to the system side, and exercises control to store the surplus power generated by the solar electric power generation device 2 into the energy storage device 3.

At this point, the electric control device 6 decides the priority that whether the surplus generated power is to be stored into the storage batteries of the energy storage device 3 or stored as thermal energy into the thermal storage device 8. Moreover, based on the decision, the electric control device 6 charges the storage batteries 7 . . . or stores the surplus generated power as thermal energy into the thermal storage device 8 (operate the thermal storage device 8). The user can set the priority in advance on the display unit 14.

Moreover, the electric control device 6 identifies the storage battery 7 . . . that has the least charged capacity, and charges that storage battery 7 in first priority among the storage batteries 7.

On the other hand, if the electric control device 6 predicts no voltage suppression will occur at the system side, it decides the method of use (purpose) of the surplus power generated by the solar electric power generation device 2. That it to say, it chooses (decides) to sell the surplus power generated by the solar electric power generation device 2 to the system side, or store the power into the energy storage device 3, or charge the storage battery 11 of the traveling object 10 with the power.

Moreover, based on the decision, it exercises control to sell electricity, charge, or store energy. In the process of electricity sale, charge, or thermal storage, the priority can be selected, and the user can set the priority in advance on the display unit 14.

For example, the surplus power generated by the solar electric power generation device 2 is sold to the system side in first priority; in addition, once the charged capacity of the first storage battery 7 is below a specified value, the sale of electricity from the solar electric power generation device 2 is stopped, and the electricity from the solar electric power generation device 2 is supplied to the first storage battery 7; moreover, electric power can be supplied from the second storage battery 7 to the household electric appliances 5 . . . .

In addition, in above electric control process, the electric power from the system side power source 1 is supplied via the switchboard 4 to the electric appliances (household electric loads) 5; however, if the electric power charged to the storage batteries 7 is adequate to operate the electric appliances (household electric loads) 5, the electric control device 6 will exercise control to supply power from the storage batteries 7 to the electric appliances (household electric loads) 5.

Moreover, the electric control device 6 can also exercise control to store the electric power from the system side power source 1 at a lower price during nocturnal time. That is to say, the household electric power system at least has an electric power supply system that charges the storage batteries 7 with the electric power at nocturnal time.

In this embodiment, the electric control device 6 predicts whether voltage suppression will occur at the system side according to the historical data including voltage fluctuation at the system side, date and time, outdoor air temperature, and meteorological condition when voltage suppression occurred at the system side previously and the present data including voltage fluctuation at the system side, date and time, outdoor air temperature, and meteorological condition, and stores the surplus power generated by the solar electric power generation device 2 as energy into the energy storage device 3 if voltage suppression is predicted to occur at the system side. Therefore, the electric control device is favorable for stabilization of electric power at the system side.

In addition, if the electric control device 6 predicts no voltage suppression will occur at the system side, the user can select whether to sell the surplus power generated by the solar electric power generation device 2 to the system side, or store the power into the energy storage device 3, or charge the storage battery 11 of the traveling object 10 in advance, which is to say, in the case that no voltage suppression will occur at the system side, the user can select the purpose of the surplus power generated by the solar electric power generation device 2 freely.

In addition, on one hand, the electric control device 6 charges the electric power generated by the solar electric power generation device 2 to at least one of the storage batteries 7 . . . ; on the other hand, the electric control device 6 controls the rest storage batteries 7 to discharge and supply power to the electric appliances (household electric loads) 5; thus, when the storage batteries 7 are charged with the generated power, they can be used as a stable power source for the household electric loads 5, and therefore it is unnecessary to buy electricity from the system side power source 1. Therefore, the electric power generated by the solar electric power generation device 2 can be utilized more stably than before, without any waste.

Moreover, at least one of the storage batteries 7 that constitute the energy storage device 3 is compatible with the storage battery 11 in the traveling object 10; therefore, the compatible storage batteries 7 can be charged and prepared at the house side even when the traveling object 10 is not in the house. Moreover, in case of power outage or any emergency, the storage battery 11 in the traveling object 10 can be used as a power source for the house.

In addition, energy storage device 3 further has a thermal storage device 8 that can store electric energy as thermal energy, besides the storage batteries 7; therefore, the surplus power generated by the solar electric power generation device 2 can be stored as thermal energy in the thermal storage device 8.

INDUSTRIAL APPLICABILITY

In the present invention, the electric control device predicts whether voltage suppression will occur at the system side according to the historical data when voltage suppression occurred at the system side previously and the present data; if voltage suppression is predicted to occur at the system side, the electric control device will store the surplus power generated by the solar electric power generation device into the energy storage device; thus, the surplus power generated by the solar electric power generation device can be switched from selling electricity to the system side to storing energy. As a result, the energy can be utilized without any waste.

The invention claimed is:

1. A household electric power system, comprising:
   an external system side power source;
   a solar electric power generation device connected to the system side power source;
   an energy storage device that stores the electric power generated by the solar electric power generation device as energy; and
   an electric control device that predicts whether voltage suppression will occur at the system side power source by comparing historical data including at least one of voltage fluctuation at the system side power source, date and time, outdoor air temperature and meteorological condition when voltage suppression occurred at the system side power source previously to present data including at least one of voltage fluctuation at the system side power source, date and time, outdoor air temperature and meteorological condition, and stores surplus power generated by the solar electric power generation device into the energy storage device if the voltage suppression is predicted to occur at the system side power source by the electric control device.

2. The household electric power system according to claim 1, wherein, if the electric control device predicts no voltage suppression will occur at the system side power source, the electric control device determines to sell the surplus electric power generated by the solar electric power generation device to the system side power source or store the surplus electric power into the energy storage device.

3. The household electric power system according to claim 1, wherein, the energy storage device comprises a plurality of storage batteries;
   the electric control device charges at least one of the plurality of storage batteries with the surplus electric power generated by the solar electric power generation device, and controls the remaining storage batteries to discharge in order to supply power to household electric loads.

4. The household electric power system according to claim 3, wherein at least one of the plurality of storage batteries that constitute the energy storage device is compatible with a storage battery in a traveling object.

5. The household electric power system according to claim 3, wherein, the energy storage device further has a thermal storage device that can store electric energy as thermal energy, besides the storage batteries.

6. The household electric power system according to claim 2, wherein, the energy storage device comprises a plurality of storage batteries;
   the electric control device charges at least one of the plurality of storage batteries with the surplus electric power generated by the solar electric power generation device, and controls the remaining storage batteries to discharge in order to supply power to household electric loads.

7. The household electric power system according to claim 4, wherein, the energy storage device further has a thermal storage device that can store electric energy as thermal energy, besides the storage batteries.

8. The household electric power system according to claim 1, wherein the electric control device is connected to a temperature sensor that determines the outdoor air temperature.

9. The household electric power system according to claim 1, wherein the electric control device is connected a network, which enables the electric control device to obtain meteorological data from the network.

* * * * *